(12) United States Patent
Tatsumi et al.

(10) Patent No.: US 8,007,153 B2
(45) Date of Patent: Aug. 30, 2011

(54) PROJECTOR TYPE VEHICLE LIGHT AND METHOD FOR MANUFACTURING THE SAME

(75) Inventors: Yoichi Tatsumi, Tokyo (JP); Yoshiaki Akiyama, Tokyo (JP)

(73) Assignee: Stanley Electric Co., Ltd., Tokyo (JP)

(\*) Notice: Subject to any disclaimer, the term of this patent is extended or adjusted under 35 U.S.C. 154(b) by 322 days.

(21) Appl. No.: 12/466,360

(22) Filed: May 14, 2009

(65) Prior Publication Data

US 2009/0296419 A1    Dec. 3, 2009

(30) Foreign Application Priority Data

May 14, 2008    (JP) .................................. 2008-127383

(51) Int. Cl.
*F21V 33/00* (2006.01)

(52) U.S. Cl. ......... 362/539; 362/513; 362/509; 362/538

(58) Field of Classification Search ........................ None
See application file for complete search history.

(56) References Cited

U.S. PATENT DOCUMENTS

| | | | |
|---|---|---|---|
| 2006/0056192 A1* | 3/2006 | Yagi et al. ..................... | 362/512 |
| 2006/0164852 A1* | 7/2006 | Mochizuki et al. ........... | 362/539 |
| 2007/0247864 A1* | 10/2007 | Suzuki .......................... | 362/538 |
| 2007/0247865 A1* | 10/2007 | Kinoshita et al. ............. | 362/538 |

FOREIGN PATENT DOCUMENTS

| | | |
|---|---|---|
| JP | 2007-213938 A | 8/2007 |
| JP | 2008-027768 A | 2/2008 |

\* cited by examiner

*Primary Examiner* — Laura Tso

(74) *Attorney, Agent, or Firm* — Kenealy Vaidya LLP

(57) ABSTRACT

A projector type vehicle light can have a decreased total weight and prevent the insufficiency in strength of a rotational shaft of a base member. The projector type vehicle light can include a light source, a reflector, a shade, and a projection lens. The vehicle light can further include a shade rotational shaft extending in the left-to-right direction, a base member configured so that the shade can rotate around the shade rotational shaft, a solenoid for making the shade rotate between a low-beam position and a high-beam position, and a crank shaft configured to connect the solenoid with the shade for driving the shade. The solenoid can be supported by the base member so that the plunger of the solenoid can move in the left-to-right direction. The lens holder can be made of a first material, such as a resin material, and the base member can be made from a second material, such as metal material.

19 Claims, 14 Drawing Sheets

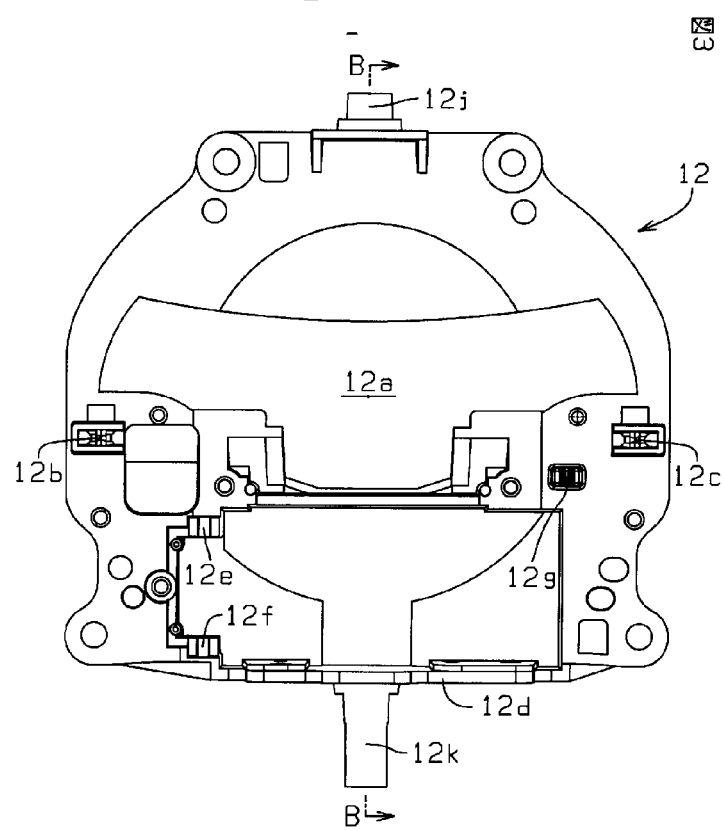
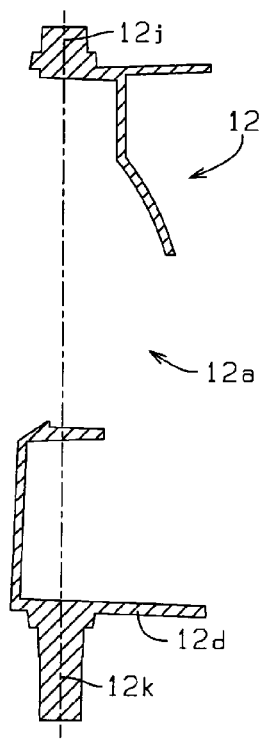
Fig. 7A
Fig. 7B

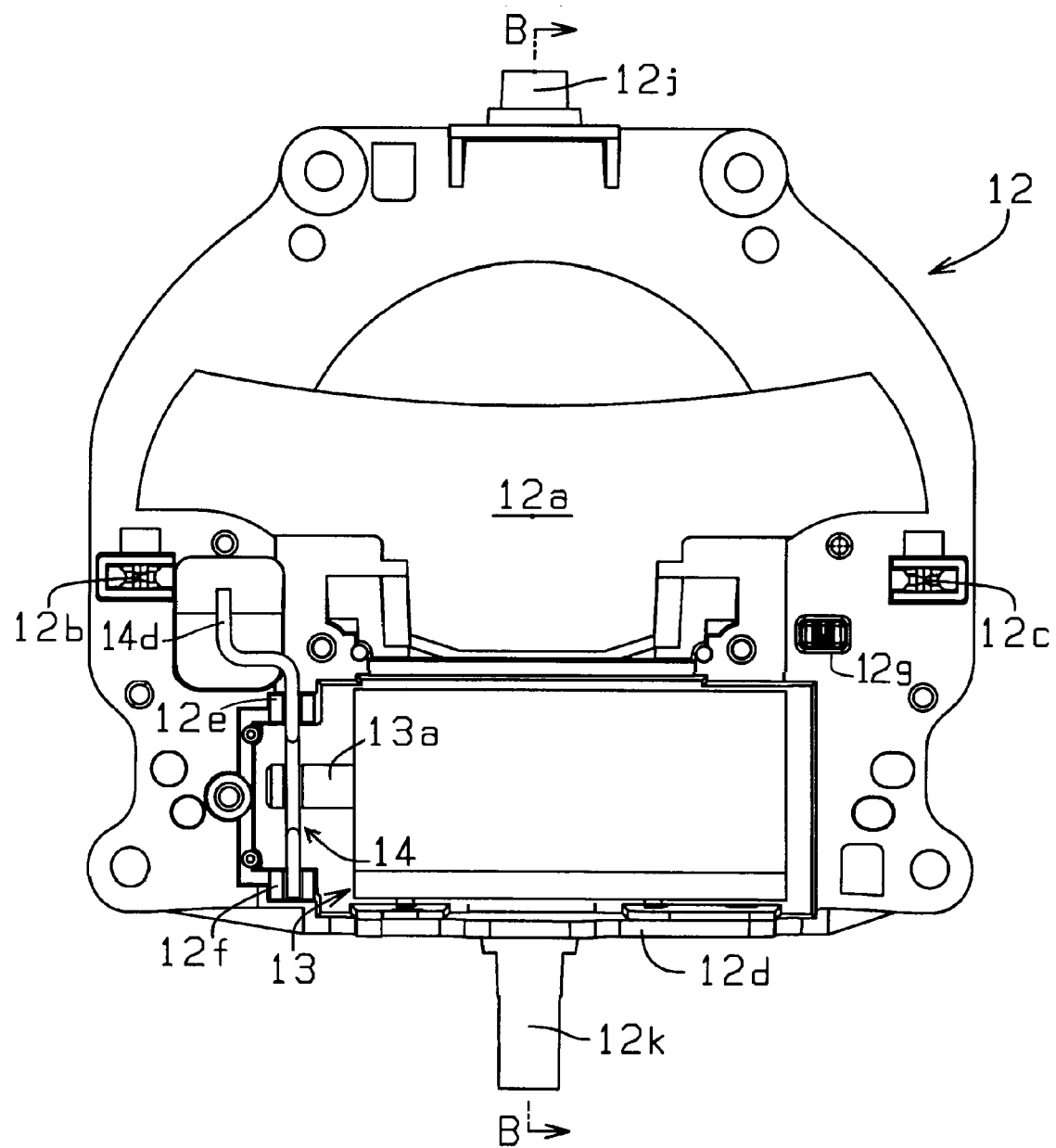

PROJECTOR TYPE VEHICLE LIGHT AND METHOD FOR MANUFACTURING THE SAME

This application claims the priority benefit under 35 U.S.C. §119 of Japanese Patent Application No. 2008-127383 filed on May 14, 2008, which is hereby incorporated in its entirety by reference.

BACKGROUND

1. Technical Field

The presently disclosed subject matter relates to a projector type vehicle light including a shade that can be rotated between a low-beam position and a high-beam position by a solenoid. In particular, the presently disclosed subject matter relates to a projector type vehicle headlight that can have a decreased total weight and prevent the strength insufficiency of a rotational shaft when the lamp unit is allowed to be rotated around the rotational shaft extending in a vertical direction of the projector type vehicle headlight.

2. Description of the Related Art

Conventionally, various projector type vehicle headlights are known that include a light source, a reflector configured to reflect light from the light source, a shade configured to shield part of the light received from the reflector, and a projection lens configured to project light that is not shielded by the shade. Examples of this type of vehicle headlights include those shown in FIGS. 1 and 2 (corresponding to FIGS. 1 and 4 of Japanese Patent Application Laid-Open No. 2007-213938).

In the description of the present application, the directions for describing a light or headlight (front and rear, left and right, and up and down directions) are defined based on the state where the light is installed in a normal vehicle unless otherwise specifically defined.

The projector type vehicle headlight as shown in FIGS. 1 and 2 includes, in addition to the above basic components, a shade rotational shaft extending in a horizontal direction (left-to-right direction) of the headlight, a base member configured to support the shade around the shade rotational shaft so that the shade can rotate freely, a solenoid configured to rotate the shade between a low-beam position and a high-beam position, and a crank shaft for connecting the solenoid with the shade for driving and rotating of the shade.

In this structure, when the solenoid is turned off, the shade is disposed at the low-beam position to shield part of light from the reflector, thereby forming a low-beam light distribution pattern.

When the solenoid is turned on, the plunger of the solenoid is retracted to rotate the crank shaft connected thereto. Then, the rotated crank shaft can move the shade.

As a result, the shade is allowed to be disposed at the high-beam position to form a high-beam light distribution pattern.

When the solenoid is disposed so that the moving direction of the plunger can be aligned with the front-to-rear direction, the size of the vehicle headlight in the front-to-rear direction can be relatively large. However, in this structure, the solenoid can be disposed so that the moving direction of the plunger can be aligned with the horizontal direction (left-to-right or side to side direction) of the projector type vehicle headlight, and therefore, the size of the vehicle headlight in the front-to-rear direction can be relatively smaller than when the plunger moving direction is aligned in the front to rear direction.

It should be noted that there is no disclosure about what supports the solenoid and what holds the projection lens in the vehicle headlight of FIGS. 1 and 2.

On the other hand, in the projector type vehicle headlight in FIGS. 3 and 4 (corresponding to FIGS. 1 and 3 of Japanese Patent Application Laid-Open No. 2008-27768), the solenoid is supported by a holder which also holds the projection lens.

It should be noted that there is no disclosure about what material the holder for supporting the solenoid and holding the projection lens is made of.

When the holder of the projector type vehicle headlight in FIGS. 3 and 4 is made of a metal material, the entire weight of the headlight is increased.

When the holder of the projector type vehicle headlight in FIGS. 3 and 4 is made of a resin material, the headlight can lighten as a whole.

However, when the holder includes a rotational shaft extending vertically in the headlight and a lamp unit containing the light source, reflector, holder, shade, projection lens and the like connected to one another is allowed to rotate around the rotational shaft, the strength of the rotational shaft may be decreased.

SUMMARY

The presently disclosed subject matter was devised in view of these and other characteristics, features, and problems and in association with the conventional art. According to an aspect of the presently disclosed subject matter, a projector type vehicle light or headlight can have a decreased total weight and prevent the strength insufficiency of a rotational shaft when a lamp unit can be allowed to be rotated around the rotational shaft extending in a vertical direction of the projector type vehicle headlight, the lamp unit containing a light source, reflector, base member, lens holder, shade, projection lens and the like connected to one another.

According to another aspect of the presently disclosed subject matter, a projector type vehicle light can include: a light source; a reflector configured to reflect light from the light source; a shade configured to shield part of light received from the reflector, having a shade rotational shaft extending in a left-to-right direction of the projector type vehicle light; a projection lens configured to project light not shielded by the shade; a base member configured to support the shade so that the shade can rotate around the shade rotational shaft; a solenoid having a plunger for making the shade rotate between a low-beam position and a high-beam position, the solenoid being supported by the base member so that a moving direction of the plunger can be aligned with the left-to-right direction of the projector type vehicle light; and a crank shaft configured to connect the solenoid with the shade for driving the shade. The vehicle light can further include a lens holder configured to hold the projection lens, the lens holder being formed of a member separate from the base member, the lens holder being made of a resin material and the base member being made of a metal material.

According to another aspect of the presently disclosed subject matter, the projector type vehicle light of the immediately above-described aspect can be configured such that the light source, the reflector, the base member, the lens holder, the shade and the projection lens are connected to one another to constitute a lamp unit. The projector type vehicle light can further include a rotational shaft extending in a vertical direction (up-to-down direction) of the projector type light and formed integrally with the base member so that the lamp unit can rotate around the rotational shaft.

According to another aspect of the presently disclosed subject matter, the projector type vehicle light of the immediately above-described aspect can be configured such that the rotational shaft extending in the vertical direction of the projector type vehicle light can be disposed on or near a vertical line on which the center of gravity of the lamp unit is positioned.

According to yet another aspect of the presently disclosed subject matter, a method for manufacturing the projector type vehicle light of any of the above-described aspects can include: preparing a molding device including a first mold and a second mold relatively moving in the front-to-rear direction of the projector type vehicle light, a first slide mold or a third slide mold disposed above, and moving upward with respect to, the first mold and the second mold, and a second slide mold or a fourth slide mold disposed below, and moving downward with respect to, the first mold and the second mold, the molds being used for molding the base member; when the rotational shaft extending in the vertical direction of the projector type vehicle light is molded integrally with the base member, using the first slide mold having a cavity for the rotational shaft and the second slide mold having a cavity for the rotational shaft to mold the base member, or when the rotational shaft extending in the vertical direction of the projector type vehicle light is not integrally molded with the base member, using the third slide mold having no cavity for the rotational shaft and the fourth slide mold having no cavity for the rotational shaft to mold the base member.

According to still another aspect of the presently disclosed subject matter, the manufacturing method of the immediately above-described aspect can be configured such that, when the center of gravity of the lamp unit is disposed on the front half part of the base member, the first slide mold and the second slide mold can have the respective cavities for the rotational shaft in respective front half parts thereof, and when the center of gravity of the lamp unit is disposed on the rear half part of the base member, the first slide mold and the second slide mold can have the respective cavities for the rotational shaft in respective rear half parts thereof.

The projector type vehicle light of the presently disclosed subject matter can include a shade that can be disposed at the low-beam position when the solenoid is turned off so that the shade can shield part of light from the reflector to form a low-beam light distribution pattern. On the other hand, as the solenoid is turned on and the plunger thereof is retracted, the crank shaft connected to the plunger can be allowed to be rotated.

Then, the crank shaft abutting against the shade can move the shade rotationally to allow the shade to be disposed at the high-beam position. This configuration can provide a high-beam light distribution pattern.

The solenoid can be supported by the base member such that the moving direction of the plunger of the solenoid can be aligned with the left-to-right direction of the projector type vehicle light. Accordingly, when compared with the case where the solenoid can be supported by the base member so that the moving direction of the plunger of the solenoid can be aligned with the front-to-rear direction, the size in the front-to-rear direction of the projector type vehicle light can be miniaturized.

In addition, the lens holder for holding the projection lens can be formed of a member separate from the base member. In this instance, the lens holder can be made of a resin material while the base member can be made of a metal material. When compared with the case where the lens holder is made of a metal material, the projector type vehicle light can lighten as a whole.

In one embodiment, the light source, the reflector, the base member, the lens holder, the shade, and the projection lens are connected to one another to constitute a lamp unit. The lamp unit can be allowed to be rotated around the rotational shaft extending in the vertical direction of the projector type vehicle light. Then, the rotational shaft and the base member are integrally formed with each other.

Namely, the rotational shaft can be made of a metal material integrally with the base member. Accordingly, when compared with the case where the rotational shaft is made of a resin material so that the shaft has an insufficient strength, the presently disclosed subject matter can provide a sufficient strength to the rotational shaft.

The projector type vehicle light of the presently disclosed subject matter can be configured such that the rotational shaft can be disposed on or near the vertical line on which the center of gravity of the lamp unit is positioned. Accordingly, when compared to the case where the rotational shaft is disposed away from the vertical line containing the center of gravity, the moment applied to the rotational shaft can be reduced. This can further reduce the rotational resistance of the lamp unit with the rotational shaft as its center.

The manufacturing method of the projector type vehicle light of the presently disclosed subject matter can be configured such that, when the rotational shaft extending in the vertical direction of the projector type vehicle light is molded integrally with the base member, the first slide mold having a cavity for the rotational shaft and the second slide mold having a cavity for the rotational shaft are used. Alternatively, when the rotational shaft is not integrally molded with the base member, the third slide mold having no cavity for the rotational shaft and the fourth slide mold having no cavity for the rotational shaft are used.

Accordingly, when different type of base member is molded, there may be no need to replace the entire molding device, but only the first slide mold and the second slide mold are replaced with the third slide mold and the fourth slide mold. This can facilitate the selective manufacturing of a base member with or without the rotational shaft.

The manufacturing method of the projector type vehicle light of the presently disclosed subject matter can be configured such that, when the center of gravity of the lamp unit is disposed on the front half part of the base member, the first slide mold and the second slide mold can have the cavity for the rotational shaft in respective front half parts thereof. Alternatively, when the center of gravity of the lamp unit is disposed on the rear half part of the base member, the first slide mold and the second slide mold can have the cavity for the rotational shaft in respective rear half parts thereof.

Accordingly, when different type of base member is molded, there may be no need to replace the entire molding device, but only the first slide mold and the second slide mold are replaced with another set of the first slide mold and the second slide mold having the cavity in respective rear half parts thereof. This can facilitate the selective manufacturing of a base member with the rotational shaft disposed in the rear or front part.

BRIEF DESCRIPTION OF THE DRAWINGS

These and other characteristics, features, and advantages of the presently disclosed subject matter will become clear from the following description with reference to the accompanying drawings, wherein:

FIGS. 7A and 7B are schematic diagrams illustrating parts of the base member of FIG. 5;

FIG. 11 is a schematic view illustrating the assembly of the base member, the solenoid, and the crank shaft of FIG. 5;

DETAILED DESCRIPTION OF EXEMPLARY EMBODIMENTS

Figure 5:
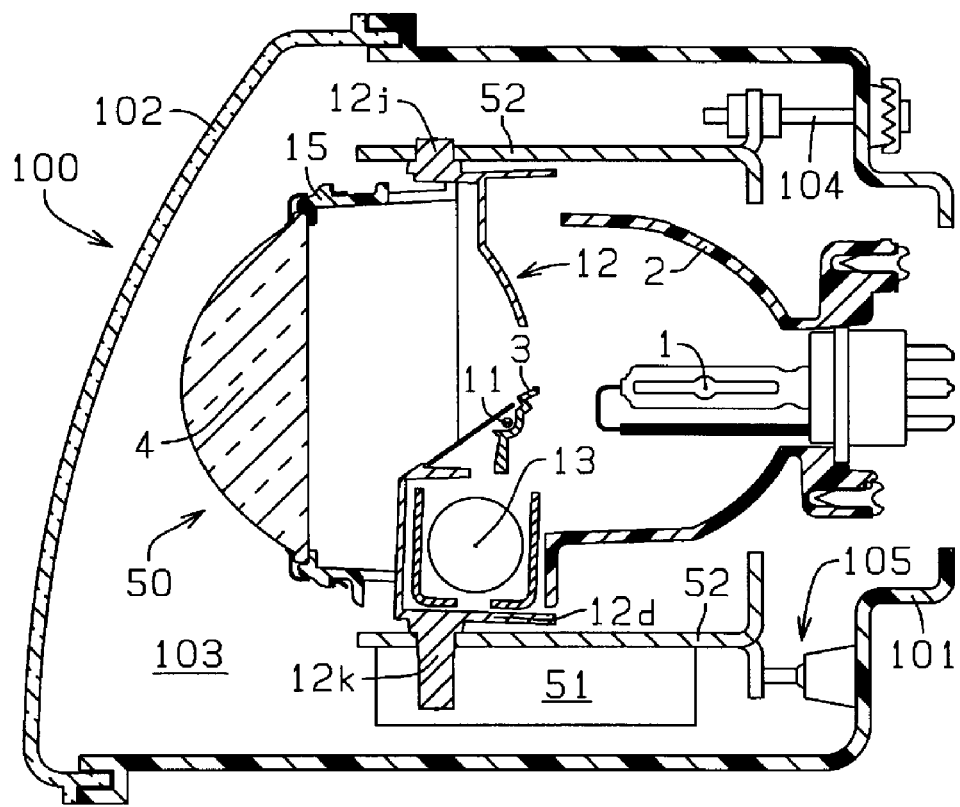
FIG. 5 is a schematic cross-sectional view illustrating a first exemplary embodiment of a projector type vehicle headlight made in accordance with principles of the presently disclosed subject matter when viewed from its right side.

A description will now be made below to projector type vehicle lights of the presently disclosed subject matter with reference to the accompanying drawings in accordance with exemplary embodiments. FIG. 5 is a schematic cross-sectional view illustrating a projector type vehicle headlight 100 of a first exemplary embodiment cut along the front-to-rear direction.

As shown in FIG. 5, the projector type vehicle headlight 100 of the first exemplary embodiment can include a light source 1 such as a bulb, a reflector 2 configured to reflect light from the light source 1, a shade 3 configured to shield part of the light received from the reflector 2, and a projection lens 4 configured to project light not shielded by the shade 3.

The reflector 2 can be a molded article made of a resin material and can include a reflecting surface with deposited aluminum. The presently disclosed subject matter is not limited to this particular embodiment, and the reflector 2 can be made of a metal material such as a die cast aluminum part, etc.

The shade 3 can be a die cast aluminum part. The presently disclosed subject matter is not limited to this particular embodiment, and the shade 3 can be made of any appropriate material such as a sheet metal, ceramic, coated plastic, etc.

The projector lens 4 can be made of a transparent resin material in a predetermined shape.

The reflector 2 can be connected to the projector lens 4 via the base member 12 and the lens holder 15.

The base member 12 can be made of a metal material such as a die cast aluminum part. The lens holder 15 for holding the projection lens 4 can be made of a resin material by a molding method. Namely, in the projector type vehicle headlight 100 of the first exemplary embodiment, as shown in FIG. 5, the lens holder 15 and the base member 12 are formed of respective separate members.

The shade 3 can be supported by the base member 12 so that the shade 3 can rotate freely around the shade rotational shaft 11 extending in the right-to-left direction of the projector type vehicle headlight 100. In this illustrate example, the shade 3 and the shade rotational shaft 11 can be formed of respective separate members. However, the presently disclosed subject matter is not limited to a particular embodiment. Instead, the shade 3 and the shade rotational shaft 11 can be formed as a single part member.

In the projector type vehicle headlight 100 of the first exemplary embodiment, as shown in FIGS. 5 and 11, the solenoid 13 can be configured to rotate and move the shade 3 between the low-beam position and the high-beam position. This solenoid 13 can be installed in the seat portion 12d of the base member 12.

As shown in FIG. 5, in the projector type vehicle headlight 100 of the first exemplary embodiment, the light source 1, the reflector 2, the base member 12, the shade rotational shaft 11, the shade 3, the solenoid 13, the lens holder 15, and the projector lens 4 are connected to one another to constitute a lamp unit 50. The lamp unit 50 can be supported a bracket 52 so that it can rotate around rotational shafts 12j and 12k extending in a vertical direction of the projection type vehicle headlight 100 (in the up-to-down direction of FIG. 5). An actuator 51 can be provided to rotate the lamp unit 50 with respect to the bracket 52. The lamp unit 50, the bracket 52, the actuator 51 can constitute an assembly. The vehicle headlight 100 can further include a housing 101 and a cover lens 102 together defining a lighting chamber 103. This assembly can be disposed within the lighting chamber 103. In this state, the bracket 52 and the housing 101 may be connected to each other via an aiming screw 104 and a ball joint 105.

Figure 6A:
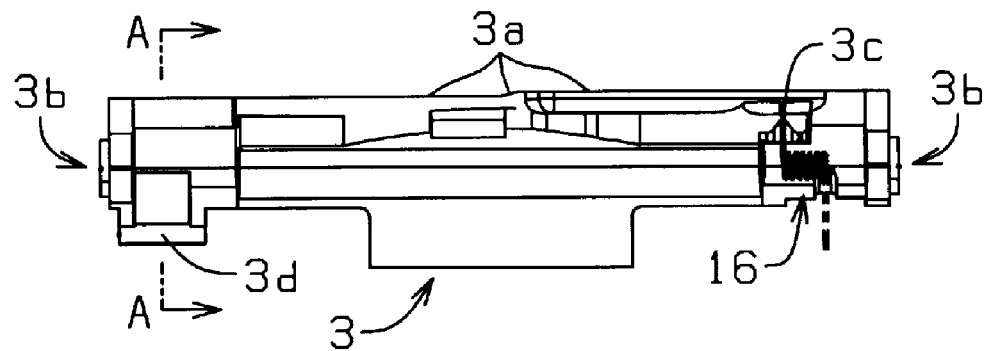
FIGS. 6A, 6B, and 6C are schematic diagrams illustrating parts of the shade of FIG. 5.
Figure 6B:
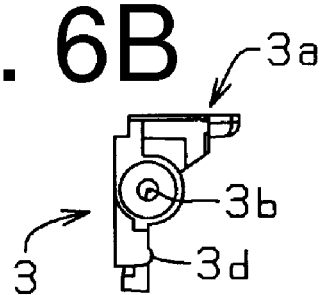
Figure 6C:
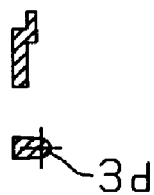

FIGS. 6A, 6B, and 6C show the shade 3 of FIG. 6. Specifically, FIG. 6A is a rear side view of the shade 3 and the like (as seen from the rear side of the projector type vehicle headlight 100 in which the shade 3 is installed). FIG. 6B is a right side view of the shade 3 (as seen from the left side of the shade 3 of FIG. 6A). FIG. 6C is a cross-sectional view taken along a line A-A in FIG. 6A. FIGS. 7A and 7B are diagrams illustrating the base member 12 of FIG. 5. Specifically, FIG. 7A is a rear side view of the base member 12 (as seen from the rear side of the projector type vehicle headlight 100 in which the base member 12 is installed). FIG. 7B is a cross-sectional view taken along a line B-B in FIG. 7A.

Figure 8A:
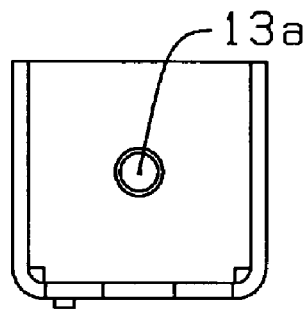
FIGS. 8A, 8B, and 8C are schematic diagrams of the solenoid of FIG. 5.
Figure 8B:
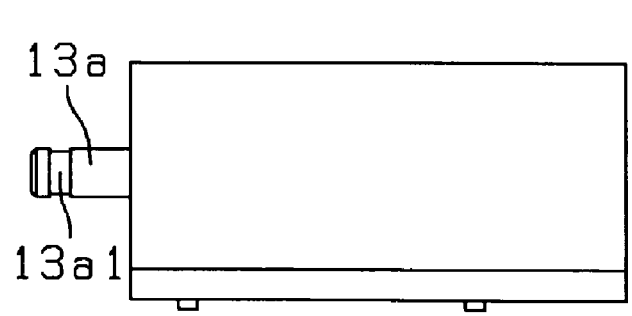
Figure 8C:
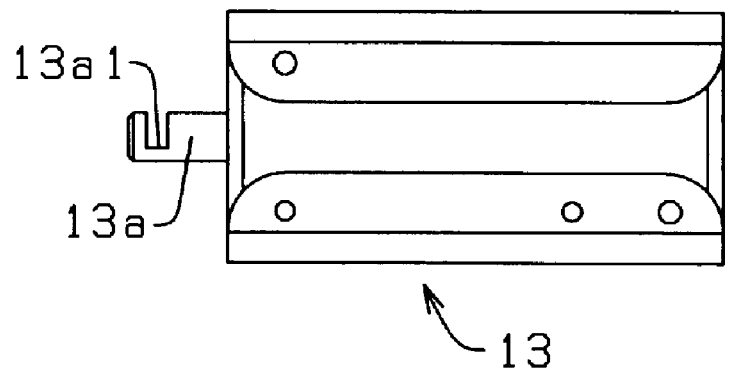

FIGS. 8A, 8B, and 8C are schematic diagrams of the solenoid 13 of FIG. 5. Specifically, FIG. 8A is a right side view of the solenoid 13 (as seen from the right side of the projector type vehicle headlight 100 in which the solenoid 13 is installed). FIG. 8B is a rear side view of the solenoid 13 (as seen from the rear side of the projector type vehicle headlight 100 in which the solenoid 13 is installed). FIG. 8C is a bottom view of the solenoid 13 (as seen from the bottom side of the projector type vehicle headlight 100 in which the solenoid 13 is installed).

Figure 9A:
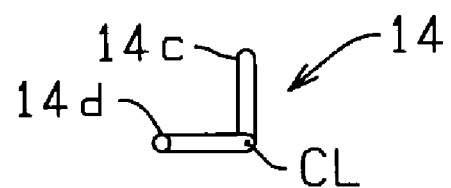
FIGS. 9A, 9B, and 9C are schematic diagrams of the crank shaft of FIG. 5 for connecting the plunger of the solenoid with the shade for driving the shade.
Figure 9B:
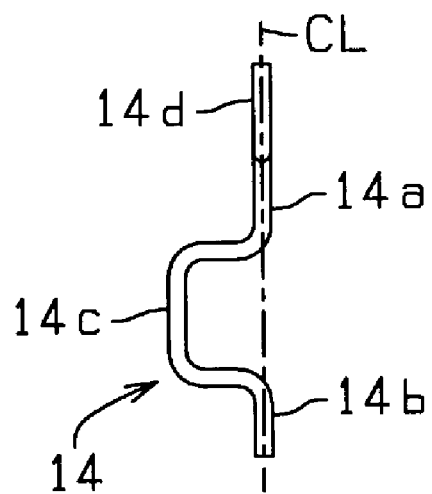
Figure 9C:
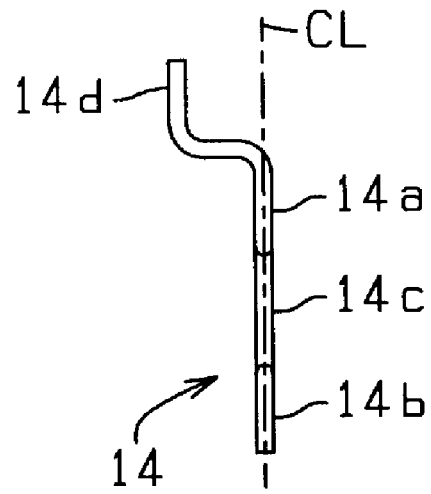
Figure 10A:
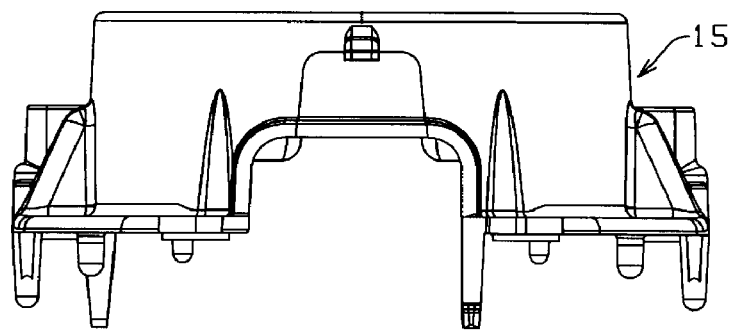
FIGS. 10A, 10B, and 10C are schematic diagrams illustrating parts of the lens holder of FIG. 5.
Figure 10B:
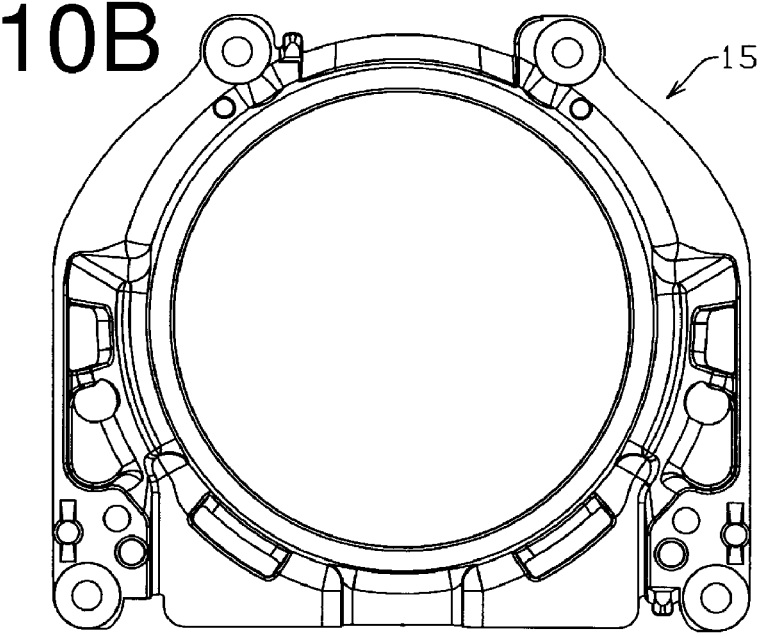
Figure 10C:
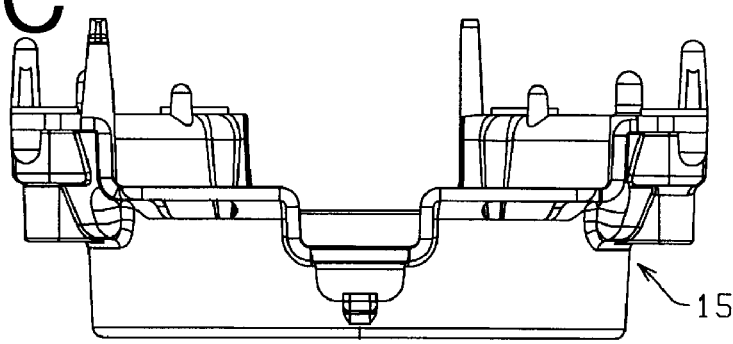

FIGS. 9A, 9B, and 9C are schematic diagrams of the crank shaft 14 of FIG. 5 for connecting the plunger 13a of the solenoid 13 with the shade for driving. Specifically, FIG. 9A is a plan view of the crank shaft 14 (as seen from the upper side of the projector type vehicle headlight 100 in which the crank shaft 14 is installed). FIG. 9B is a right side view of the crank shaft 14 (as seen from the right side of the projector type vehicle headlight 100 in which the crank shaft 14 is installed). FIG. 9C is a rear side view of the crank shaft 14 (as seen from the bottom side of the projector type vehicle headlight 100 in which the crank shaft 14 is installed). FIGS. 10A, 10B, and 10C are schematic diagrams illustrating parts of the lens holder 15 of FIG. 5. Specifically, FIG. 10A is a plan view of the lens holder 15 (as seen from the upper side of the projector type vehicle headlight 100 in which the lens holder 15 is installed). FIG. 10B is a rear side view of the lens holder 15 (as seen from the rear side of the projector type vehicle headlight 100 in which the lens holder 15 is installed). FIG. 10C is a bottom side view of the lens holder 15 (as seen from the bottom side of the projector type vehicle headlight 100 in which the lens holder 15 is installed).

In the projector type vehicle headlight 100 of the first exemplary embodiment as shown in FIGS. 5, 6A, 6B, and 6C, the upper edge 3a of the shade 3 contributes to form the cutoff line for forming the low-beam light distribution pattern. Furthermore, the shade rotational shaft 11 can be inserted into an insertion hole 3b of the shade 3. A coil spring 16 can be provided and can include one end which can be engaged with a coil engagement portion 3c of the shade 3 for urging the shade 3 toward the low-beam position.

The output part 14d of the crank shaft 14 (see FIGS. 9A, 9B, and 9C) can be allowed to abut against the abutment portion 3d of the shade 3 (see FIGS. 6A, 6B, and 6C) to rotate the shade 3 from the low-beam position to the high-beam position.

The base member 12 can include an opening 12a substantially at its center area (see FIG. 7A). Accordingly, the light reflected from the reflector 2 is allowed to pass through the opening 12a of the base member 12. The right end portion of the shade rotational shaft 11 can be supported by a groove 12b of the base member 12 to be freely rotated while the left end portion of the shade rotational shaft 11 can be supported by a groove 12c of the base member 12. Specifically, for example, the right end portion and left end portion of the shade rotational shaft 11 are inserted into the respective grooves 12b and 12c of the base member 12, and cover members (not shown) cover the respective grooves 12b and 12c of the base member 12 to complete the supporting structure.

On the other hand, as shown in FIGS. 9A, 9B, and 9C, the crank shaft 14 can include the input part 14c, upper and lower supported parts 14a and 14b, and the output part 14d. The upper and lower supported parts 14a and 14b are rotatably supported by respective grooves 12e and 14f of the base member 12 (see FIG. 11). Specifically, for example, the upper and lower supported parts 14a and 14b of the crank shaft 14 are inserted into the respective grooves 12e and 12f of the base member 12, and cover members (not shown) cover the respective grooves 12e and 12f of the base member 12 to complete the supporting structure.

Further the other end of the coil spring 16 can be engaged with a coil engagement portion 12g of the base member 12 for urging the shade 3 toward the low-beam position (see FIGS. 6A, 7A, and 11).

Furthermore, as shown in FIGS. 9A, 9B, 9C, 11, 12A, 12B, 12C and 12D, the output part 14c of the crank shaft 14 can be fit into the groove 13a1 of the plunger 13a of the solenoid 13.

Figure 12A:
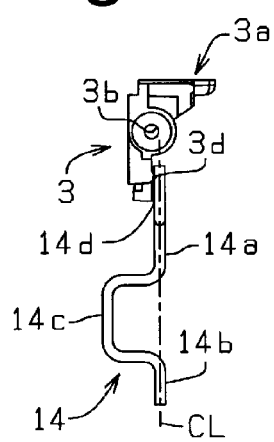
FIGS. 12A, 12B, 12C and 12D are schematic diagrams illustrating a linkage mechanism for rotating and moving the shade between the low-beam position and the high-beam position for the light of FIG. 5.
Figure 12B:
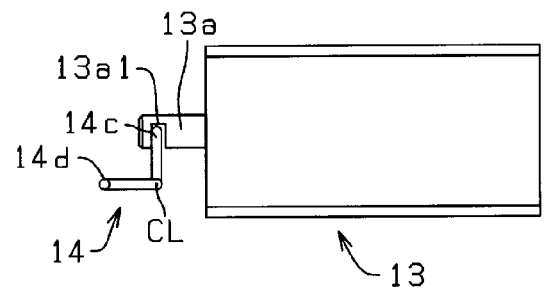
Figure 12C:
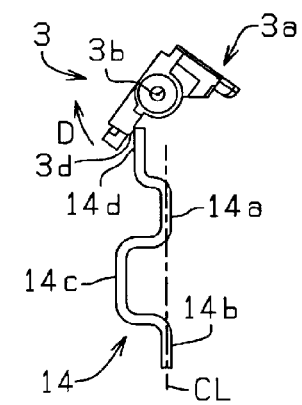
Figure 12D:
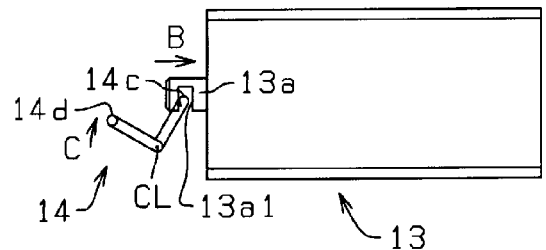

FIGS. 12A, 12B, 12C, and 12D illustrate an exemplary linkage mechanism for rotating and moving the shade 3 between the low-beam position and the high-beam position. Specifically, FIG. 12A is a right side view of the crank shaft 14 and the shade 3 which is disposed at the low-beam position (where the shade 3 shields part of the light path). FIG. 12B is a plan view of the solenoid 13 and the crank shaft 14 in the state where the shade 3 is disposed at the low-beam position. FIG. 12C is a right side view of the crank shaft 14 and the shade 3 which is disposed at the high-beam position (where the shade 3 is retracted from the light path). FIG. 12D is a plan view of the solenoid 13 and the crank shaft 14 in the state where the shade 3 is disposed at the high-beam position.

In the projector type vehicle headlight 100 of the first exemplary embodiment, the solenoid 13 is turned off (see FIG. 12B) when the low-beam light distribution pattern is to be formed. In this case, the plunger 13a of the solenoid 13 is not retracted. Then, the shade 3 can be urged by the coil spring 16 (see FIG. 6A) toward the low-beam position (at the position as shown in FIG. 12A). As a result, as shown in FIGS. 5 and 12A, the upper edge 3a of the shade 3 can be disposed to shield the light path of light reflected from the reflector 2. Therefore, the upper edge 3a of the shade 3 can form the cut-off line of the low-beam light distribution pattern.

When the high-beam light distribution pattern is to be formed, the solenoid 13 is turned on (see FIG. 12D). Then, as shown by the arrow B in FIG. 12D, the plunger 13a of the solenoid 13 is retracted. As a result, as shown by the arrow C in FIG. 12D, the crank shaft 14 is allowed to be rotated around the rotational center axis CL. Consequently, the output part 14d of the crank shaft 14 pushes the abutment portion 3d of the shade 3 to move and rotate the shade 3 around the shade rotational shaft 11 (located in through hole 3b) as shown by the arrow D in FIG. 12C (see FIG. 5). As a result, the upper edge 3a of the shade 3 can be retracted from the light path of light reflected from the reflector 2 to form the high-beam light distribution pattern.

The solenoid 13 can be supported by the base member 12 such that the moving direction of the plunger 13a of the solenoid 13 can be aligned with the left-to-right direction of the projector type vehicle headlight 100 (in the perpendicular and normal to paper direction of FIG. 5 and in the left-to-right direction in FIGS. 12B and 12D). Accordingly, when compared to the case where the solenoid 13 is supported by the base member 12 so that the moving direction of the plunger 13a of the solenoid 13 is aligned with the front-to-rear direction of the projector type vehicle headlight 100 (in the left-to-right direction in FIG. 5), the size in the front-to-rear direction of the projector type vehicle headlight can be miniaturized.

In addition, in the projector type vehicle headlight 100 of the first exemplary embodiment, the lens holder 15 for holding the projection lens 4 can be formed of a member separate from the base member 12 as shown in FIGS. 5, 7A, 7B, 10A, 10B, and 10C. In this instance, the lens holder 15 can be made of a resin material while the base member 12 can be made of a metal material. When compared with the case where the lens holder 15 is made of a metal material, the projector type vehicle headlight 100 can lighten as a whole.

In the projector type vehicle headlight 100 of the first exemplary embodiment, as shown in FIG. 5, the lamp unit 50 can be allowed to be rotated around the rotational shafts 12j and 12k extending in the vertical direction of the projector type vehicle headlight 100. Then, as shown in FIGS. 7A and 7B, the rotational shaft 12*j* and 12*k* and the base member 12 are integrally formed with each other. Namely, the rotational shafts 12*j* and 12*k* are made of a metal material integrally with the base member 12.

Accordingly, when the rotational shafts 12*j* and 12*k* are made of a resin material, they have an insufficient strength. However, the projector type vehicle headlight 100 of the presently disclosed subject matter can provide a sufficient strength to the rotational shaft, thereby solving the problems associated with the conventional art.

In the projector type vehicle headlight 100 of the first exemplary embodiment, as shown in FIG. 5, the rotational shafts 12*j* and 12*k* extending in the vertical direction can be disposed on or near the vertical line on which the center of gravity of the lamp unit 50 is positioned. When the rotational shafts 12*j* and 12*k* are disposed away from the vertical line containing the center of gravity of the lamp unit 50, a predetermined moment can be applied to the rotational shafts, thereby increasing the rotational resistance. However, the projector type vehicle headlight 100 of the presently disclosed subject matter can further reduce the rotational resistance of the lamp unit.

Furthermore, the shade 3 can be disposed just above the solenoid 13 as shown in FIG. 5. Accordingly, when compared to the case where the solenoid 13 is disposed behind the shade 3 (at the right side of FIG. 5), the projector type vehicle headlight 100 of the presently disclosed subject matter can prevent the solenoid 13 from being heated by the light source 1. Furthermore, when compared with the case where the solenoid 13 is disposed before the shade 3 (at the left side of FIG. 5), the distance between the shade 3 and the projection lens 4 can be reduced.

The projector type vehicle headlight 100 of the first exemplary embodiment can prevent temperature increase of the solenoid 13 due to the heat from the light source 1 as well as reduce a distance between the shade 3 and the projection lens 4.

Furthermore, in the projector type vehicle headlight 100 of the first exemplary embodiment, the rotational center axis CL of the crank shaft 14 extends in the vertical direction of the projector type vehicle headlight 100 (in the up-to-down direction of FIGS. 9B and 9C). As shown in FIG. 7A, the base member 12 can be formed with the grooves 12*e* and 12*f* which can function as a bearing for rotatably supporting the crank shaft 14. The grooves 12*e* and 12*f* are disposed above and below the plunger 13*a* of the solenoid 13 (see FIGS. 7A and 8B).

Accordingly, when compared with the case where a bearing for rotatably supporting the crank shaft 14 is provided either above or below the plunger 13*a* of the solenoid, the projector type vehicle headlight 100 of the first exemplary embodiment can suppress the axial deviation of the crank shaft 14 so that the crank shaft 14 can smoothly rotate.

As shown in FIGS. 12B and 12D, when the solenoid 13 is turned on or off, the plunger 13*a* of the solenoid 13 can move in the left-to-right direction of the projector type vehicle headlight 100 (in the left-to-right direction in FIGS. 12B and 12D). In this case, the rotational center axis CL of the crank shaft 14 extends in the vertical direction of the projector type vehicle headlight 100 (in the perpendicular and normal to paper direction for FIGS. 12B and 12D), and the plunger 13*a* of the solenoid 13 can linearly move. Then, the trajectory of the contact point between the crank shaft 14 and the plunger 13*a* of the solenoid 13 becomes an approximately arc around the rotational center axis CL as a center.

Figure 1:
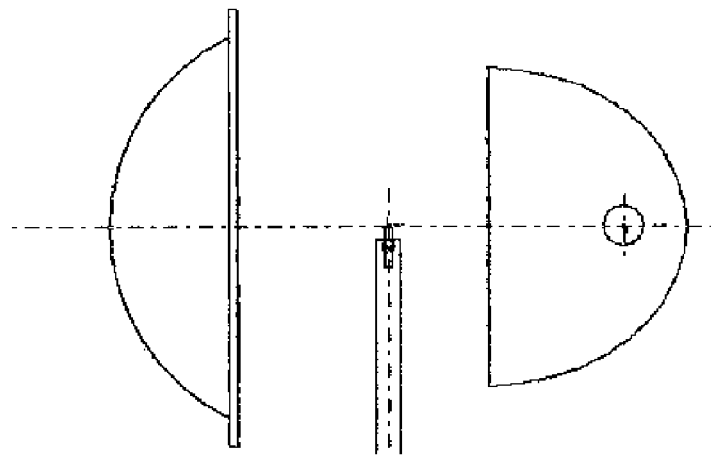
FIG. 1 is a cross-sectional view illustrating a conventional projector type vehicle headlight (corresponding to FIG. 1 of Japanese Patent Application Laid-Open No. 2007-213938)
Figure 2:
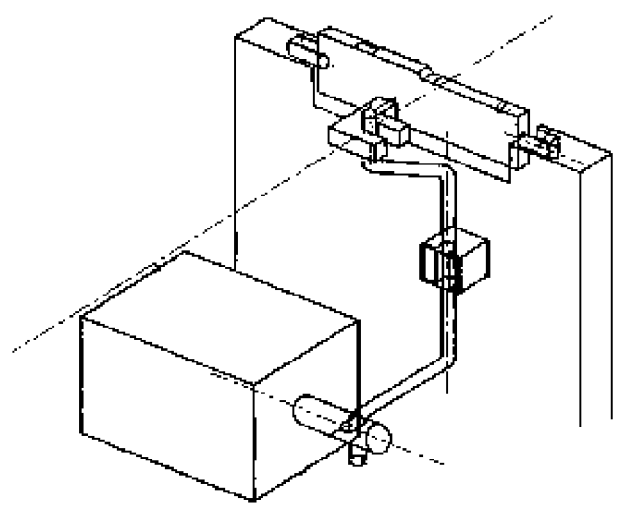
FIG. 2 is a perspective view illustrating a shade and surrounding parts of the conventional projector type vehicle headlight (corresponding to FIG. 4 of Japanese Patent Application Laid-Open No. 2007-213938)
Figure 3:
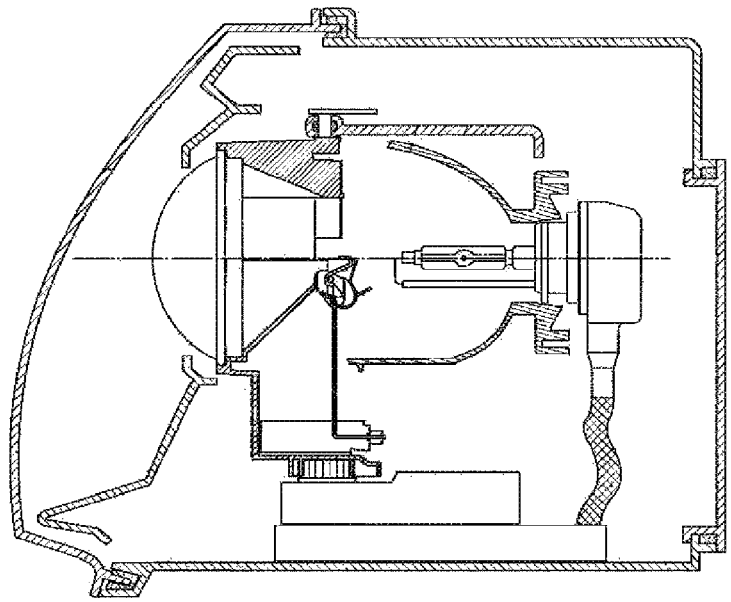
FIG. 3 is a cross-sectional view illustrating a conventional projector type vehicle headlight (corresponding to FIG. 1 of Japanese Patent Application Laid-Open No. 2008-27768)
Figure 4:
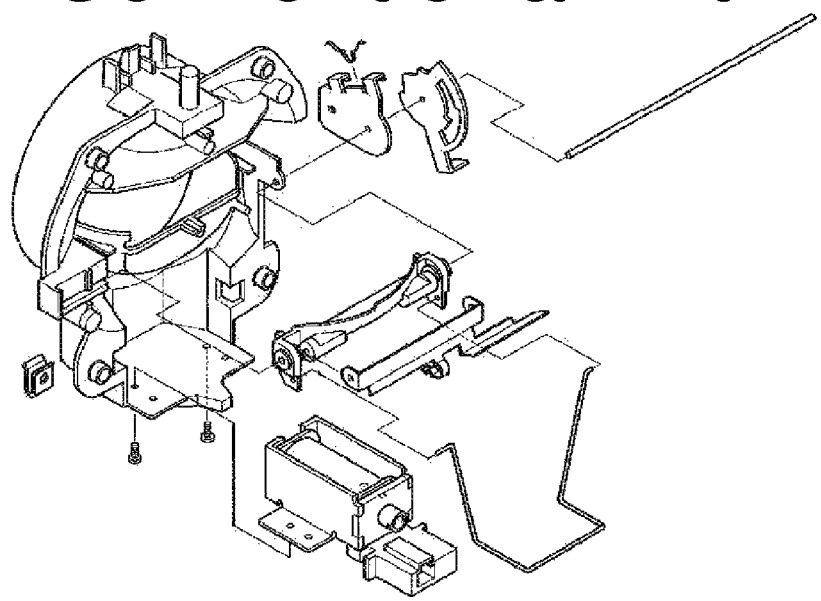
FIG. 4 is a perspective view illustrating a shade and surrounding parts of the conventional projector type vehicle headlight (corresponding to FIG. 3 of Japanese Patent Application Laid-Open No. 2008-27768)

If a crank shaft is fit into a cylindrical hole of a plunger that linearly moves in a projector type vehicle headlight as shown in FIG. 2 (corresponding to FIG. 4 of Japanese Patent Application Laid-Open No. 2007-213938), the contact point between the crank shaft and the plunger of the solenoid cannot move on an arc, meaning that the crank shaft cannot smoothly move.

In view of this, as shown in FIGS. 12B and 12D the plunger 13*a* of the solenoid 13 of the projector type vehicle headlight 100 of the first exemplary embodiment has a groove 13*a*1 opened toward one direction, in particular, rearward (lower side in FIGS. 12B and 12D). The crank shaft 14 can be fit in the groove 13*a*1 of the plunger 13*a* of the solenoid 13.

In this state, as shown in FIGS. 12B and 12D the solenoid 13 is turned on or off to move the plunger 13*a* of the solenoid 13 in the left-to-right direction of the projector type vehicle headlight 100 (in the left-to-right direction in FIGS. 12B and 12D). The input part 14*c* of the crank shaft 14 can be fit into the groove 13*a*1 of the plunger 13*a* of the solenoid 13 so that it relatively moves within the groove 13*a*1 in the front-to-rear direction of the projector type vehicle headlight 100 with respect to the plunger 13*a* (in the vertical direction in FIGS. 12B and 12D).

As a result, the contact point between the crank shaft 14 and the plunger 13*a* of the solenoid 13 can move on the approximate arc so that the crank shaft 14 can smoothly rotate.

When the solenoid 13 is turned on or off and the crank shaft 14 is made to rotate, the trajectory of the contact point 14 between the crank shaft 14 and the shade 3 can be an approximate arc when viewed from above (plan view) and from its side (side view).

If a crank shaft is fit into a groove of a shade in a projector type vehicle headlight as shown in FIG. 2 (corresponding to FIG. 4 of Japanese Patent Application Laid-Open No. 2007-213938), the contact point between the crank shaft and the shade cannot move on an arc, meaning that the crank shaft and the shade cannot smoothly rotate.

In view of this, the shade 3 of the projector type vehicle headlight 100 of the first exemplary embodiment can include an abutment portion 3*d* configured such that the output part 14*d* of the crank shaft 14 can abut against the abutment portion 3*d* (see FIGS. 12A, 12B, 12C, and 12D), and the abutment portion 3*d* can be formed by a half of an approximate cylindrical surface extending in the left-to-right direction of the projector type vehicle headlight 100 (in the perpendicular and normal to paper direction in FIGS. 6B and 6C).

In this state, in the projector type vehicle headlight 100 of the first exemplary embodiment, when the solenoid 13 is turned on or off to rotate the crank shaft 14 as shown in FIGS. 12A and 12C. Then, the output part 14*d* of the crank shaft 14 can move on the half cylindrical surface of the abutment portion 3*d* of the shade 3.

As a result, the contact point between the output part 14*d* of the crank shaft 14 and the abutment portion 3*d* of the shade 3 can move on the approximate arc trajectory as seen in a plan view in the projector type vehicle headlight 100 of the first exemplary embodiment. Furthermore, the contact point between the output part 14*d* of the crank shaft 14 and the abutment portion 3*d* of the shade 3 can move on the approximate arc trajectory as seen in a side view so that the crank shaft 14 and the shade 3 can smoothly rotate.

Figure 13:
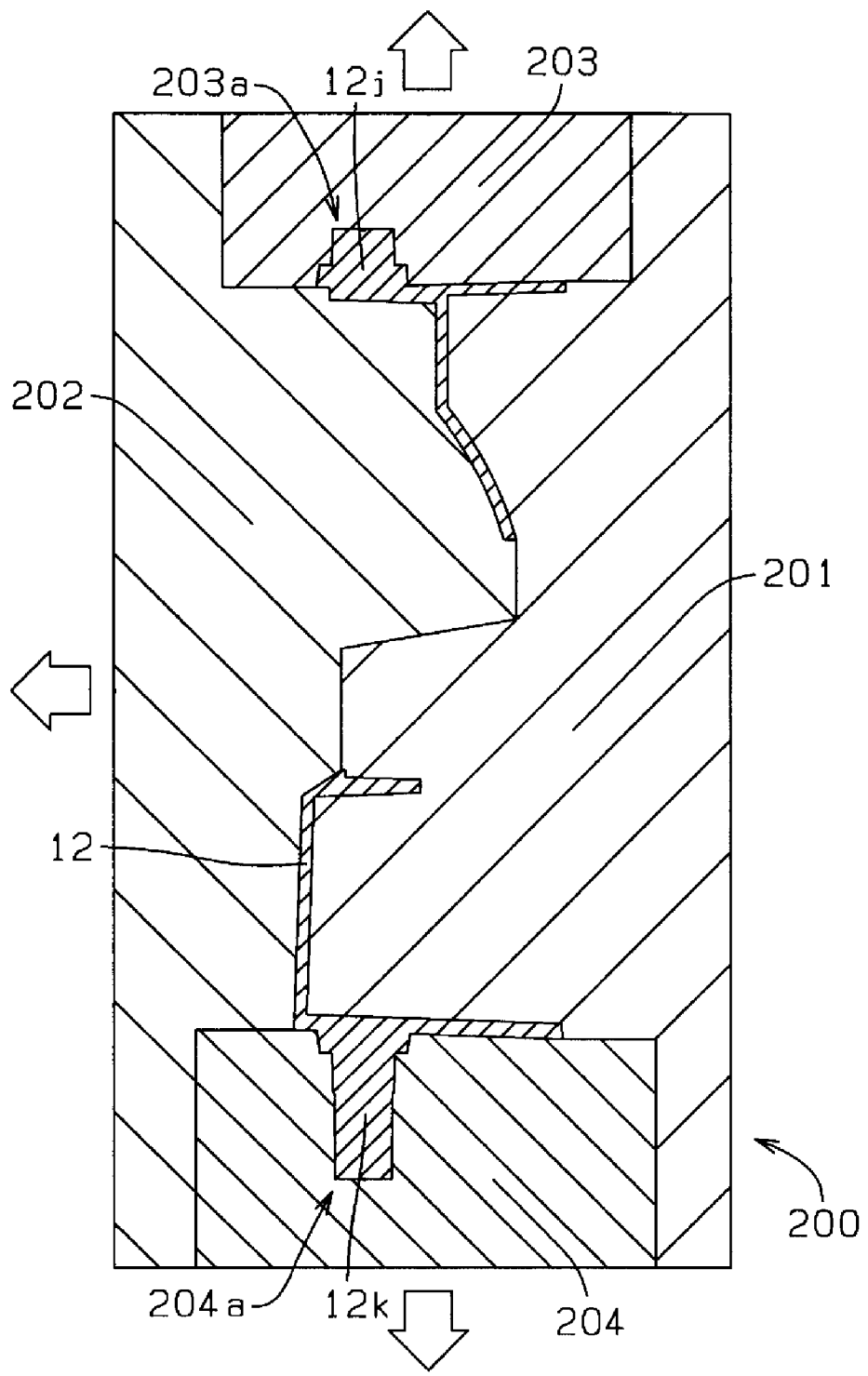
FIG. 13 is a schematic view illustrating a molding device for molding the base member of the projector type vehicle headlight according to the first exemplary embodiment.

FIG. 13 is a schematic diagram illustrating a molding device 200 used for molding the base member 12 of the projector type vehicle headlight of the first exemplary embodiment. As shown in FIG. 13, the molding device 200 can include a fixed mold 201 (a first mold) and a movable mold 202 (a second mold) relatively moved in the front-to-rear direction of the projector type vehicle headlight 100 (in the left-to-right direction of FIG. 13). Further included are slide molds 203 and 204 (first and second slide molds) moving upward and downward with respect to the projector type vehicle headlight 100, respectively (upward and downward in FIG. 13).

In particular, as shown in FIG. 13, the slide mold 203 can be provided with a cavity 203a for the rotational shaft so that the rotational shaft 12j extending upward in the projector type vehicle headlight 100 (upper side in FIG. 13) can be integrally molded with the base member 12. In addition to this, the slide mold 204 can be provided with a cavity 204a for the rotational shaft so that the rotational shaft 12k extending upward in the projector type vehicle headlight 100 (upper side in FIG. 13) can be integrally molded with the base member 12.

Figure 14:
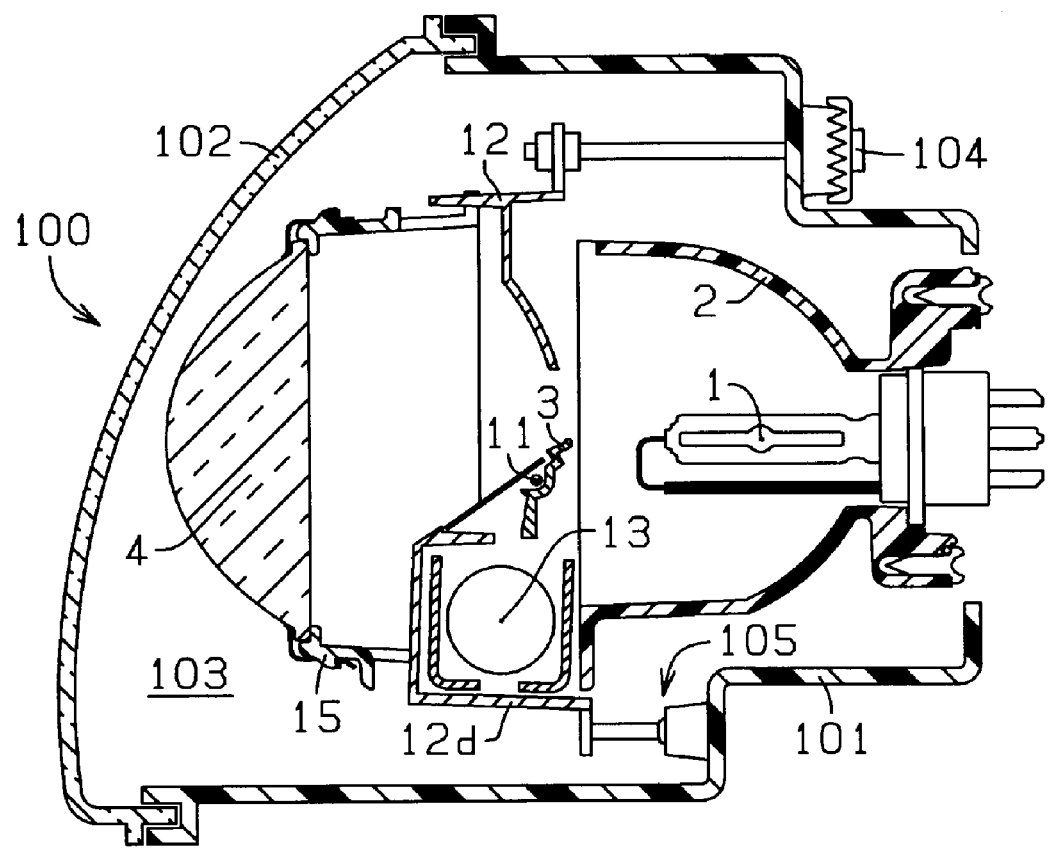
FIG. 14 is a schematic cross-sectional view illustrating a second exemplary embodiment of a projector type vehicle headlight made in accordance with principles of the presently disclosed subject matter when viewed from its right side.

FIG. 14 is a schematic cross-sectional view illustrating a projector type vehicle headlight 100 of a second exemplary embodiment made in accordance with principles of the presently disclosed subject matter when viewed from its right side. In the projector type vehicle headlight 100 of the first exemplary embodiment shown in FIG. 5, the base member 12 and the housing 101 are connected with each other via the rotational shafts 12j and 12k of the base member 12, the bracket 52, the aiming screw 104 and the ball joint 105. In the projector type vehicle headlight 100 of the second exemplary embodiment shown in FIG. 14, the base member 12 and the housing 101 are connected with each other via an aiming screw 104 and a ball joint 105.

Namely, the projector type vehicle headlight 100 of the second exemplary embodiment, as shown in FIG. 14, does not include the bracket 52 (see FIG. 5) and the base member 12 does not include the rotational shafts 12j and 12k (see FIG. 5).

Figure 15:
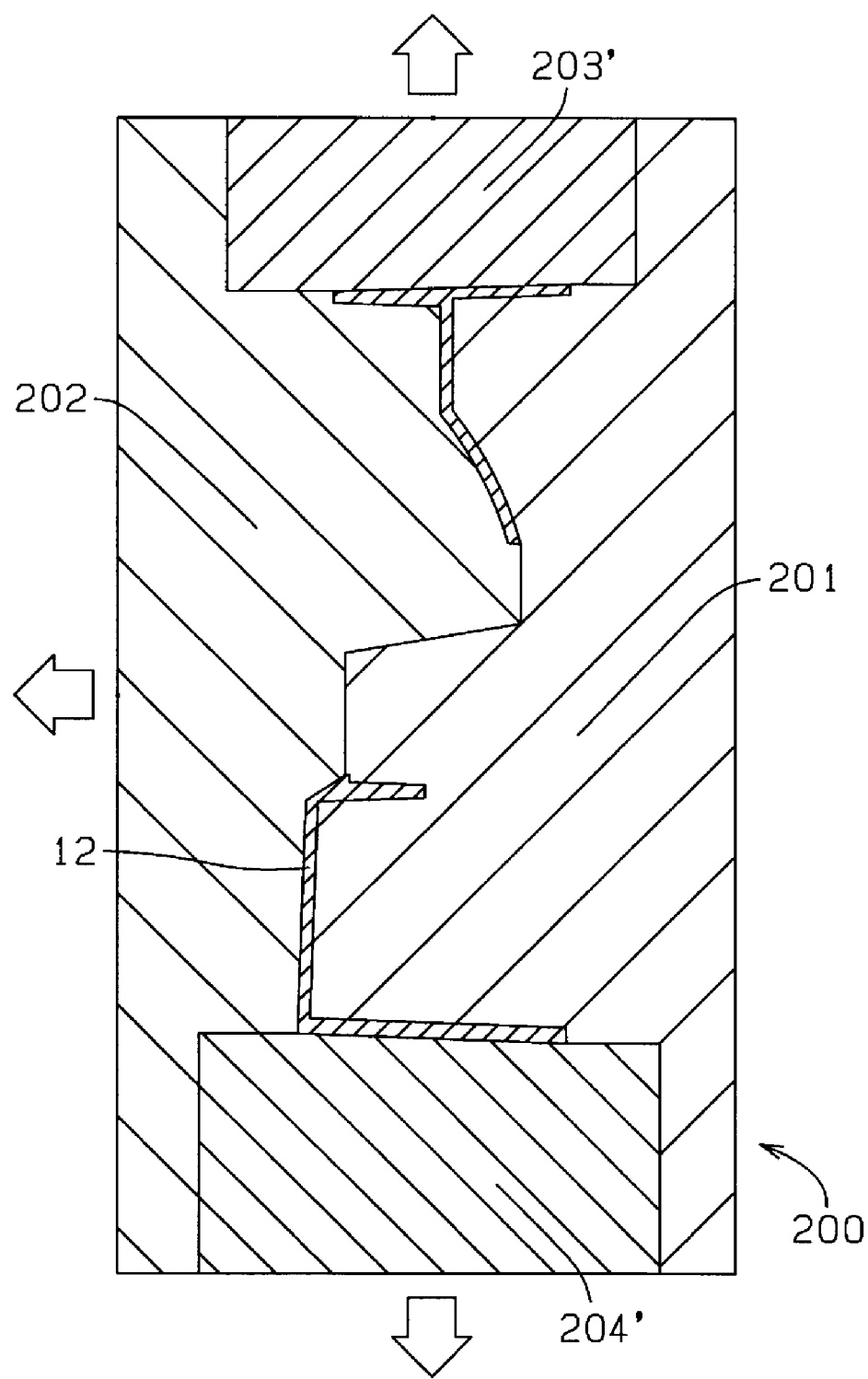
FIG. 15 is a schematic view illustrating a molding device for molding the base member of the projector type vehicle headlight according to the second exemplary embodiment.

FIG. 15 is a schematic view illustrating a molding device 200 for molding the base member 12 of the projector type vehicle headlight 100 according to the second exemplary embodiment. As shown in FIGS. 13 and 15, the molding device 200 (see FIG. 15) can include partly the same molds as those of the molding device 200 (see FIG. 13) for molding the base member 12 of the first exemplary embodiment.

Specifically, when the base member 12 of the projector type vehicle headlight 100 according to the first exemplary embodiment is molded, the slide molds 203 and 204 having respective cavities 203a and 204a for the rotational shafts are used as shown in FIG. 13. On the contrary, when the base member 12 of the projector type vehicle headlight 100 according to the second exemplary embodiment is molded, as shown in FIG. 15, the slide molds 203' and 204' having no cavity for the rotational shafts are used.

In other words, the molds 201 and 202 are common to the cases of molding the base member 12 of the first and second exemplary embodiments (see FIGS. 13 and 15).

Figure 16:
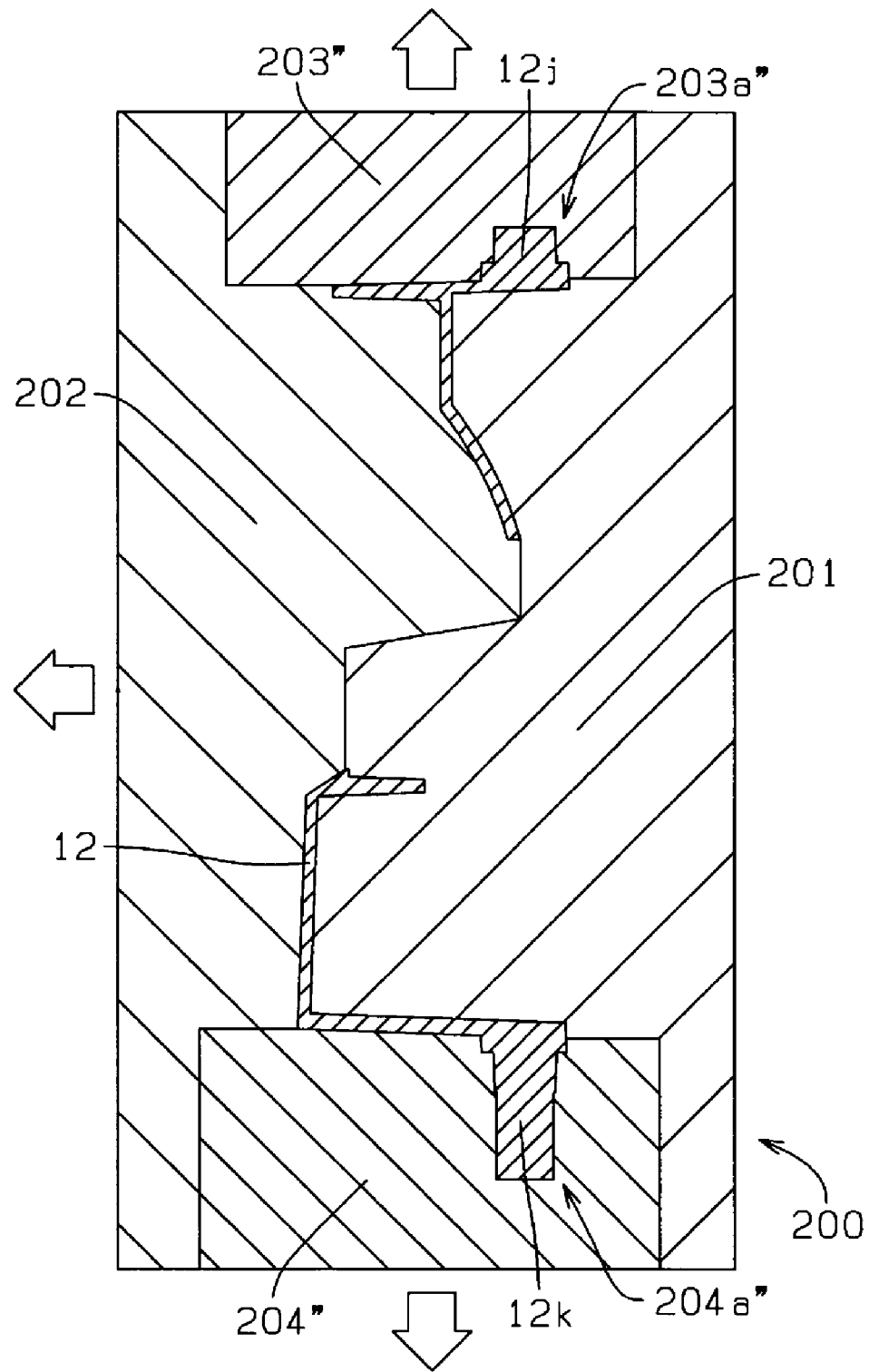
FIG. 16 is a schematic view illustrating a molding device for molding the base member of the projector type vehicle headlight according to a third exemplary embodiment.

FIG. 16 is a schematic view illustrating a molding device 200 for molding the base member 12 of the projector type vehicle headlight 100 according to a third exemplary embodiment. As shown in FIGS. 13 and 16, the molding device 200 (see FIG. 16) can include partly the same molds as those of the molding device 200 (see FIG. 13) for molding the base member 12 of the first exemplary embodiment.

In the projector type vehicle headlight 100 of the first exemplary embodiment, as shown in FIG. 5, the center of gravity of the lamp unit 50 can be disposed on the front half part (left side in FIG. 5) of the base member 12. In order to mold the base member 12 with the rotational shaft, as shown in FIG. 13, the slide molds 203 and 204 can have the cavities 203a and 204a for the rotational shaft in respective front half parts thereof (left side in FIG. 13), respectively.

On the other hand, in the projector type vehicle headlight 100 of the third exemplary embodiment, the center of gravity of the lamp unit 50 can be disposed on the rear half part of the base member 12 as shown in FIG. 16. Accordingly, the slide molds 203" and 204" can have the cavities 203a" and 204a" for the rotational shaft in respective rear half parts thereof (left side in FIG. 16), respectively.

In other words, the molds 201 and 202 are common to the cases of molding the base member 12 of the first and third exemplary embodiments (see FIGS. 13 and 16).

Accordingly, as in the first, second and third exemplary embodiments, even when the positions of the rotational shafts 12j and 12k are altered in accordance with the change of the specification of the projector type vehicle headlight 100, there may be no need to change the molds 201 and 202 of the molding device 200 so that they are common to the various modifications.

Furthermore, in accordance with the change of the specification of the projector type vehicle headlight 100, the light source 1, an ignitor connected to the light source 1 (not shown), the reflector 2, and/or the projection lens 4 may be changed. When doing so, the center of gravity of the lamp unit 50 may also be changed. Even in this case, the common molds 201 and 202 can be used for molding rotational shafts 12j and 12k of the base member 12 that have been shifted in position.

It should be noted that various exemplary embodiments can be combined with one another, which fall within the scope of the presently disclosed subject matter.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related and conventional art references described above are hereby incorporated in their entirety by reference.

What is claimed is:

1. A projector type vehicle light comprising:
   a light source;
   a reflector spaced from the light source in a first direction and configured to reflect light from the light source;
   a shade configured to shield a first portion of the light reflected by the reflector and including a shade rotational shaft extending in a second direction that is substantially perpendicular to the first direction;
   a projection lens configured to project a second portion of the light reflected by the reflector, wherein the second portion of the light reflected by the reflector is different from the first portion of the light reflected by the reflector;
   a base member supporting the shade so that the shade can rotate around the shade rotational shaft;
   a solenoid supported by the base member and having a plunger movable in the second direction and connected to the shade to rotate the shade between a low-beam position and a high-beam position;
   a crank shaft movably connecting the solenoid to the shade; and
   a lens holder receiving the projection lens, the lens holder being formed of a member separate from the base member, wherein the lens holder is made of a resin material and the base member is made of a metal material.

2. The projector type vehicle light according to claim 1, wherein the light source, the reflector, the base member, the lens holder, the shade and the projection lens cooperate with one another to define a lamp unit, and the projector type vehicle light further comprises a rotational shaft extending in a third direction and formed integrally with the base member so that the lamp unit can rotate around the rotational shaft, wherein the third direction is substantially perpendicular to each of the first direction and the second direction.

3. The projector type vehicle light according to claim 2, wherein the third direction of the projector type vehicle light is substantially collinear to a vertical line on which the center of gravity of the lamp unit is positioned.

4. The projector type vehicle light according to claim 1, wherein the projector type vehicle light is a vehicle headlight.

5. A method for manufacturing the projector type vehicle light according to claim 1, the method comprising:
    providing a molding device including:
        a first mold and a second mold movable in the first direction:
        a first slide mold and a third slide mold movable in a third direction substantially perpendicular to the first direction and the second direction and moveable upward in the third direction with respect to the first mold and the second mold, wherein the first slide mold includes a shaft cavity and the third slide mold is configured different from the first slide mold; and
        a second slide mold and a fourth slide mold movable in the third direction and downward with respect to the first mold and the second mold, wherein the second slide mold includes a shaft cavity and the fourth slide mold is configured different from the second slide mold;
    forming the base member with an integral rotational shaft extending in the third direction using the first slide mold and the second slide mold and including:
        disposing the first slide mold above the first mold and the second mold; and
        disposing the second slide mold below the first mold and the second mold; and
    forming the base member without the integral rotational shaft extending in the third direction using the third slide mold and the fourth slide mold and including:
        disposing the third slide mold above the first mold and the second mold; and
        disposing the fourth slide mold below the first mold and the second mold.

6. The manufacturing method according to claim 5, wherein, when the center of gravity of the lamp unit is disposed on a front half part of the base member, the first slide mold and the second slide mold have the respective cavities in respective front half parts thereof, and when the center of gravity of the lamp unit is disposed on the rear half part of the base member, the first slide mold and the second slide mold have the respective cavities in respective rear half parts thereof.

7. A vehicle light comprising:
    a light source;
    a reflector spaced from the light source in a first direction and configured to reflect light from the light source;
    a shade configured to shield a first portion of the light reflected by the reflector and including a shade rotational axis extending in a second direction that is substantially perpendicular to the first direction;
    a projection lens configured to project a second portion of the light reflected by the reflector, wherein the second portion of the light reflected by the reflector is different from the first portion of the light reflected by the reflector;
    a base member supporting the shade so that the shade can rotate around the shade rotational axis;
    a solenoid supported by the base member and having a plunger connected to the shade to rotate the shade between a low-beam position and a high-beam position;
    a crank shaft movably connecting the solenoid to the shade; and
    a lens holder receiving the projection lens and connected to the base member, the lens holder being formed of a member separate from the base member, wherein the lens holder is made of a first material and the base member is made of a second material different from the first material.

8. The vehicle light according to claim 7, wherein the first material is a resin material and the second material is a metal material.

9. The vehicle light according to claim 7, wherein the plunger moves along a linear path that is substantially parallel to the second direction.

10. The vehicle light according to claim 9, wherein the shade rotational axis is spaced from the plunger in each of the first direction and a third direction, wherein the third direction is substantially perpendicular to each of the first direction and the second direction.

11. The vehicle light according to claim 10, wherein the crank includes:
    an upper support part rotatably mounted on the base member;
    a lower support part rotatably mounted on the base member, wherein the upper support part and the lower support part lie along a center axis that extends substantially parallel to the third direction;
    an input part movably connected to the plunger and spaced from the center axis; and
    an output part movably connected to the shade and spaced from the center axis.

12. The vehicle light according to claim 7, wherein the base member further includes a shaft extending in a third direction that is substantially perpendicular to each of the first direction and the second direction, and the shaft is integrally formed as a single homogenous component with the base member from a metal material.

13. A method for manufacturing a vehicle light comprising:
    providing a first mold, a second mold, a first slide mold including a first shaft cavity at a first relative position on the first slide mold, a second slide mold including a second shaft cavity at a second relative position on the second slide mold, a third slide mold, and a fourth slide mold;
    selecting one of the first slide mold and the third slide mold;
    selecting one of the second slide mold and the fourth slide mold;
    molding a base member with the first mold, the second mold, the selected one of the first slide mold and the third slide mold, and the selected one of the second slide mold and the fourth slide mold; and
    connecting the base member to each of:
        a light source;
        a reflector spaced from the light source in a first direction and configured to reflect light from the light source;
        a shade configured to shield a first portion of the light reflected by the reflector and including a shade rotational shaft extending in a second direction that is substantially perpendicular to the first direction;

a projection lens configured to project a second portion of the light reflected by the reflector, wherein the second portion of the light reflected by the reflector is different from the first portion of the light reflected by the reflector;

a solenoid including a plunger movable in the second direction and connected to the shade to rotate the shade between a low-beam position and a high-beam position;

a crank shaft movably connecting the solenoid to the shade; and a lens holder connected to the projection lens.

14. The method for manufacturing a vehicle light according to claim 13, wherein the molding the base member further includes:

moving at least one the first mold and the second mold substantially parallel to the first direction;

moving the selected one of the first slide mold and the third slide mold along a third direction that is substantially perpendicular to each of the first direction and the second direction; and moving the selected one of the second slide mold and the fourth slide mold along the second direction.

15. The method for manufacturing a vehicle light according to claim 13, wherein molding the base member further includes:

aligning the first mold to oppose the second mold;

closing the first mold and second mold by moving the first mold toward the second mold along the first direction;

aligning the selected one of the first slide mold and the third slide mold along a first portion of each of the first mold and second mold;

aligning the selected one of the second slide mold and the fourth slide mold along a second portion of each of the first mold and second mold, wherein the second portion is spaced from and opposite to the first portion; and closing the selected one of the first slide mold and the third slide mold and the selected one of the second slide mold and the fourth slide by moving the selected one of the first slide mold and the third slide mold toward the selected one of the second slide mold and the fourth slide mold in a third direction, wherein the third direction is substantially perpendicular to each of the first direction and the second direction.

16. The method for manufacturing a vehicle light according to claim 13, wherein molding the base member further includes molding the base member from a metal material.

17. The method for manufacturing a vehicle light according to claim 13, wherein providing further includes providing a fifth slide mold including a fifth shaft cavity at a fifth relative position on the fifth slide mold and a sixth slide mold including a sixth shaft cavity at a sixth relative position on the sixth slide mold;

wherein the fifth relative position is different from the first relative position and the sixth relative position is different from the second relative position.

18. The method for manufacturing a vehicle light according to claim 17, wherein:

selecting one of the first slide mold and the third slide mold includes selecting one of the first slide mold, the third slide mold, and the fifth slide mold; and selecting one of the second slide mold and the fourth slide mold includes selecting one of the second slide mold, the fourth slide mold, and the sixth slide mold.

19. The method for manufacturing a vehicle light according to claim 18, wherein molding the base member further includes:

aligning the first mold to oppose the second mold;

closing the first mold and second mold by moving the first mold toward the second mold along the first direction;

aligning the selected one of the first slide mold, the third slide mold, and the fifth slide mold along a first portion of each of the first mold and second mold;

aligning the selected one of the second slide mold, the fourth slide mold, and the sixth slide mold along a second portion of each of the first mold and second mold, wherein the second portion is spaced from and opposite to the first portion; and closing the selected one of the first slide mold, the third slide mold, and the fifth slide mold and the selected one of the second slide mold, the fourth slide mold, and the sixth slide mold by moving the selected one of the first slide mold, the third slide mold, and the fifth slide mold toward the selected one of the second slide mold, the fourth slide mold, and the sixth slide mold in a third direction, wherein the third direction is substantially perpendicular to each of the first direction and the second direction.

* * * * *